United States Patent
Nguyen et al.

(10) Patent No.: US 11,855,831 B1
(45) Date of Patent: Dec. 26, 2023

(54) ENABLING AN OPERATOR TO RESOLVE AN ISSUE ASSOCIATED WITH A 5G WIRELESS TELECOMMUNICATION NETWORK USING AR GLASSES

(71) Applicant: T-Mobile USA, Inc., Bellevue, WA (US)

(72) Inventors: Phi Nguyen, Lacey, WA (US); Kevin Lau, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/838,013

(22) Filed: Jun. 10, 2022

(51) Int. Cl.
*H04L 41/0604* (2022.01)
*G06F 3/01* (2006.01)
*H04W 24/04* (2009.01)
*H04L 65/403* (2022.01)

(52) U.S. Cl.
CPC .......... *H04L 41/0609* (2013.01); *G06F 3/011* (2013.01); *G06F 3/017* (2013.01); *H04L 41/0627* (2013.01); *H04L 65/403* (2013.01); *H04W 24/04* (2013.01)

(58) Field of Classification Search
CPC .. H04L 41/0609; H04L 41/0627; G06F 3/011; G06F 3/017; H04W 24/04
See application file for complete search history.

(56) References Cited

U.S. PATENT DOCUMENTS

| | | | |
|---|---|---|---|
| 7,302,397 B1 | 11/2007 | Hein et al. | |
| 7,587,753 B2 | 9/2009 | Morris et al. | |
| 8,069,472 B2 | 11/2011 | Morris et al. | |
| 8,473,432 B2 | 6/2013 | Anerousis et al. | |
| 8,972,798 B2 | 3/2015 | Kakadia et al. | |
| 9,467,583 B2 * | 10/2016 | Roulland | H04N 1/00408 |
| 9,660,862 B2 | 5/2017 | Ko et al. | |
| 9,723,502 B2 | 8/2017 | Gupta et al. | |
| 10,019,302 B2 | 7/2018 | Nguyen et al. | |
| 10,148,819 B2 | 12/2018 | Yokel et al. | |
| 10,176,458 B2 | 1/2019 | Allan et al. | |
| 10,319,128 B2 | 6/2019 | Billi-Duran et al. | |
| 10,360,735 B1 | 7/2019 | Reeder et al. | |
| 10,370,939 B2 | 8/2019 | Gopala Reddy Sunanda et al. | |

(Continued)

FOREIGN PATENT DOCUMENTS

| | | |
|---|---|---|
| CN | 103092320 A | 5/2013 |
| CN | 105278519 B | 4/2018 |

(Continued)

*Primary Examiner* — Nhat Huy T Nguyen
(74) *Attorney, Agent, or Firm* — Perkins Coie LLP

(57) ABSTRACT

The system receives an indication of an issue associated with a wireless telecommunication network and an indication of an operator capable of resolving the issue. The system sends a notification to an AR/VR device associated with the operator. The notification indicates the issue and prompts the operator to join a virtual collaboration room. The system receives a request to join the virtual collaboration room from the operator based on a gesture or a voice command detected by the AR/VR device. The system creates the virtual collaboration room, via a 5G wireless telecommunication network, including a screen shared among multiple operators. The system records operations performed in the virtual collaboration room until a resolution to the issue has been determined.

20 Claims, 15 Drawing Sheets

(56) References Cited

U.S. PATENT DOCUMENTS

| | | | |
|---|---|---|---|
| 10,388,075 B2 * | 8/2019 | Schmirler | G06F 3/147 |
| 10,410,428 B1 | 9/2019 | Reeder et al. | |
| 10,489,231 B1 | 11/2019 | Gabay et al. | |
| 10,951,764 B2 | 3/2021 | Yokel et al. | |
| 11,062,516 B2 | 7/2021 | Greenberg et al. | |
| 11,159,771 B2 | 10/2021 | Schmirler et al. | |
| 11,178,028 B1 | 11/2021 | Maseedu | |
| 11,297,513 B2 | 4/2022 | Agarwal et al. | |
| 2002/0007362 A1 | 1/2002 | Collins et al. | |
| 2005/0086248 A1 | 4/2005 | Atchison | |
| 2012/0053967 A1 | 3/2012 | Roberts et al. | |
| 2012/0150632 A1 | 6/2012 | Fan et al. | |
| 2016/0358383 A1 * | 12/2016 | Gauglitz | G06F 3/0304 |
| 2017/0103440 A1 | 4/2017 | Xing et al. | |
| 2017/0310542 A1 | 10/2017 | Nair et al. | |
| 2018/0131810 A1 | 5/2018 | Yokel | |
| 2020/0284938 A1 * | 9/2020 | Chaturvedi | G01V 15/00 |
| 2020/0374181 A1 | 11/2020 | Stenberg et al. | |
| 2020/0387804 A1 | 12/2020 | Mathur et al. | |
| 2021/0152584 A1 * | 5/2021 | Chakravarty | H04L 67/306 |
| 2021/0304513 A1 | 9/2021 | Greenberg et al. | |
| 2021/0366061 A1 | 11/2021 | Lerick et al. | |
| 2021/0397495 A1 | 12/2021 | Prakash et al. | |
| 2021/0399972 A1 | 12/2021 | Nguyen et al. | |
| 2021/0406787 A1 | 12/2021 | Zittel et al. | |
| 2022/0086069 A1 | 3/2022 | Maseedu | |
| 2022/0088397 A1 | 3/2022 | Patnaikuni et al. | |
| 2023/0105621 A1 * | 4/2023 | Karri | H04L 65/403 |
| | | | 345/419 |

FOREIGN PATENT DOCUMENTS

| | | |
|---|---|---|
| CN | 108806071 A | 11/2018 |
| CN | 109154824 A | 1/2019 |
| CN | 109247029 A | 1/2019 |
| CN | 103207565 B | 6/2019 |
| CN | 109858021 A | 6/2019 |
| CN | 104662536 B | 8/2019 |
| CN | 107111365 B | 10/2019 |
| CN | 110244677 B | 3/2020 |
| CN | 108519814 B | 6/2020 |
| CN | 111402426 A | 7/2020 |
| CN | 112075055 A | 12/2020 |
| CN | 112119386 A | 12/2020 |
| CN | 112291707 A | 1/2021 |
| CN | 109218306 B | 5/2021 |
| CN | 112955970 A | 6/2021 |
| CN | 113445987 A | 9/2021 |
| CN | 110138848 B | 11/2021 |
| DE | 102014118910 A1 | 7/2015 |
| DE | 102015109203 A1 | 12/2015 |
| DE | 202014010940 U1 | 1/2017 |
| DE | 202017105864 U1 | 1/2018 |
| DE | 102019200533 A1 | 7/2019 |
| DE | 112015003302 B4 | 8/2019 |
| DE | 112018004220 T5 | 5/2020 |
| DE | 112013006286 B4 | 2/2021 |
| DE | 112020000054 T5 | 3/2021 |
| DE | 112018008032 T5 | 6/2021 |
| DE | 102021109179 A1 | 12/2021 |
| DE | 102013222322 B4 | 1/2022 |
| DE | 102020117985 B4 | 1/2022 |
| EP | 2324459 A1 | 5/2011 |
| EP | 2778924 A1 | 9/2014 |
| EP | 3140761 A1 | 3/2017 |
| EP | 3268900 A1 | 1/2018 |
| EP | 3465459 A1 | 4/2019 |
| EP | 3625658 A1 | 3/2020 |
| EP | 3707668 A1 | 9/2020 |
| EP | 3747157 A1 | 12/2020 |
| EP | 3300005 B1 | 6/2021 |
| EP | 3318944 B1 | 7/2021 |
| EP | 3462622 B1 | 11/2021 |
| EP | 3657733 B1 | 2/2022 |
| JP | 2006507778 A | 3/2006 |
| JP | 2009075828 A | 4/2009 |
| JP | 4797297 B2 | 8/2011 |
| JP | 2016510456 A | 4/2016 |
| JP | 5974226 B2 | 7/2016 |
| JP | 6158221 B2 | 6/2017 |
| JP | 6192817 B2 | 8/2017 |
| JP | 6317339 B2 | 4/2018 |
| JP | 2018073268 A | 5/2018 |
| JP | 2018521385 A | 8/2018 |
| JP | 2018525696 A | 9/2018 |
| JP | 6426161 B2 | 11/2018 |
| JP | 2018534011 A | 11/2018 |
| JP | 2019121362 A | 7/2019 |
| JP | 2020521217 A | 7/2020 |
| KR | 100357295 B1 | 10/2002 |
| KR | 20030022775 A | 3/2003 |
| KR | 20050010717 A | 1/2005 |
| KR | 100679362 B1 | 2/2007 |
| KR | 101107394 B1 | 1/2012 |
| KR | 101236396 B1 | 2/2013 |
| KR | 101253155 B1 | 4/2013 |
| KR | 101267120 B1 | 5/2013 |
| KR | 101421346 B1 | 7/2014 |
| KR | 101462086 B1 | 11/2014 |
| KR | 101591579 B1 | 2/2016 |
| KR | 101840706 B1 | 3/2018 |
| KR | 101845872 B1 | 4/2018 |
| KR | 20180123581 A | 11/2018 |
| KR | 20190010646 A | 1/2019 |
| KR | 102090763 B1 | 4/2020 |
| KR | 20210013049 A | 2/2021 |
| WO | 0067426 A2 | 11/2000 |
| WO | 2011046715 A2 | 4/2011 |
| WO | 2015025251 A1 | 2/2015 |
| WO | 2015112108 A1 | 7/2015 |
| WO | 2015171581 A1 | 11/2015 |
| WO | 2016018252 A1 | 2/2016 |
| WO | 2017214271 A1 | 12/2017 |
| WO | 2017217870 A1 | 12/2017 |
| WO | 2018085696 A2 | 5/2018 |
| WO | 2018122709 A1 | 7/2018 |
| WO | 2018125996 A1 | 7/2018 |
| WO | 2018189660 A1 | 10/2018 |
| WO | 2018209295 A1 | 11/2018 |
| WO | 2018213801 A1 | 11/2018 |
| WO | 2018235096 A1 | 12/2018 |
| WO | 2019023659 A1 | 1/2019 |
| WO | 2019149368 A1 | 8/2019 |
| WO | 2019157107 A1 | 8/2019 |
| WO | 2020123707 A1 | 6/2020 |
| WO | 2020145981 A1 | 7/2020 |
| WO | 2020180815 A1 | 9/2020 |
| WO | 2021016271 A2 | 1/2021 |
| WO | 2021247663 A2 | 12/2021 |

* cited by examiner

ENABLING AN OPERATOR TO RESOLVE AN ISSUE ASSOCIATED WITH A 5G WIRELESS TELECOMMUNICATION NETWORK USING AR GLASSES

BACKGROUND

Wireless telecommunication systems, including 5G systems, function well most of the time, but when they are not functioning, or happen to be in a critical situation, finding the right expertise to resolve the issue is challenging. In the current fast-changing environment, network attacks and cyberattacks happen every second, and support personnel need to have access, every day of the week and at all hours, to high-speed internet, a physical laptop, and a mobile phone. A trip to the grocery store is risky if high-visibility system issues arise. Support personnel and leaders do not have visibility into real-time application metrics and broken application key performance indicators (KPIs) while on road trips (whether work or personal) without sufficient computer hardware and high-speed internet. Relaying information over the phone or text messages can be frustrating and time-consuming. Delayed information and lack of deep insights can lead to delays in restoring critical wireless telecommunication infrastructure.

BRIEF DESCRIPTION OF THE DRAWINGS

Detailed descriptions of implementations of the present invention will be described and explained through the use of the accompanying drawings.

Figure 1:
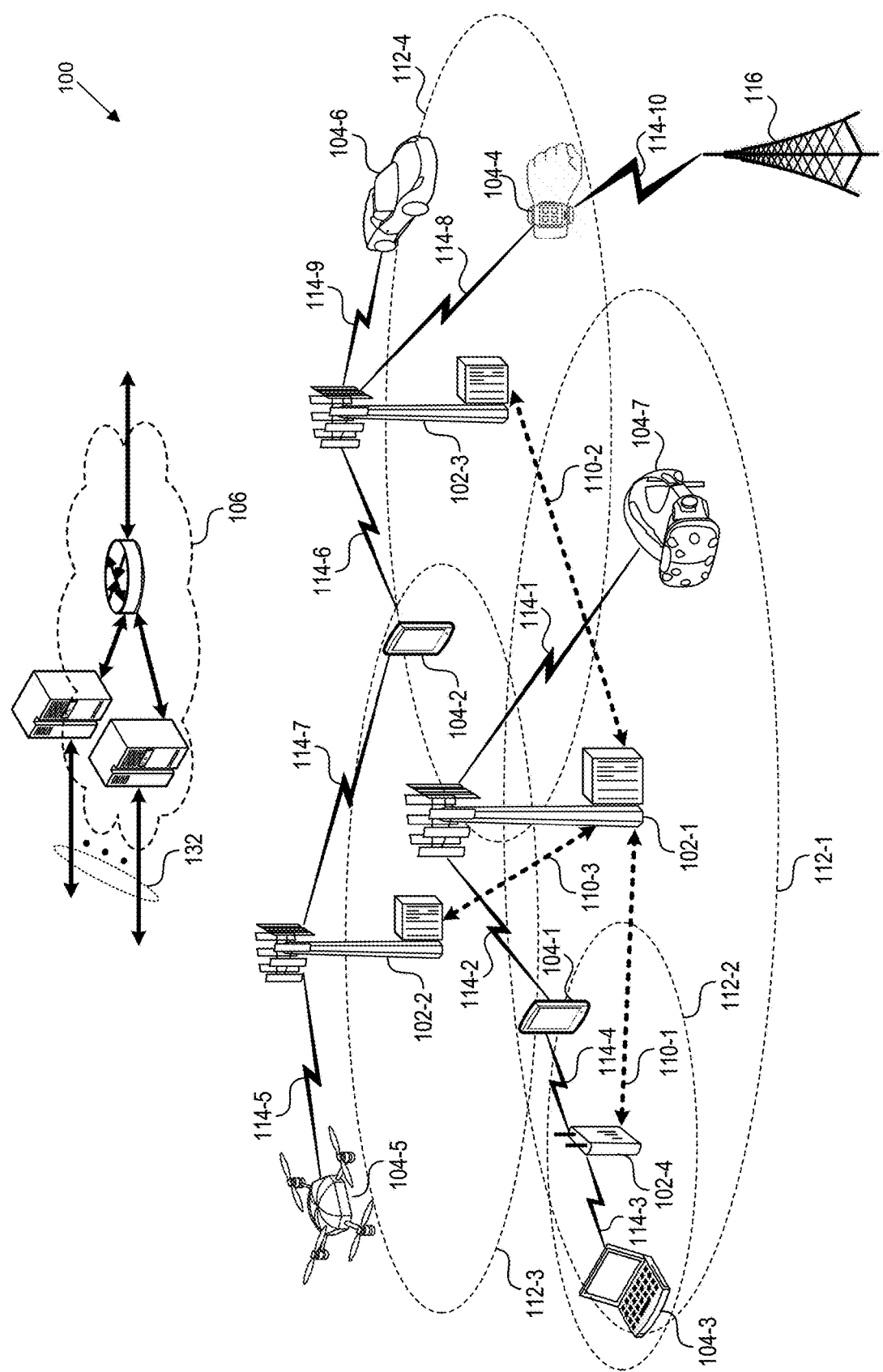
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method that utilizes a 5G wireless telecommunication network and advanced technology such as augmented reality (AR) and/or virtual reality (VR) to enable operators to support the wireless telecommunication network anytime and anywhere without the need for a physical laptop. An AR/VR device works like a small computer anywhere there is a 5G network. An operator can run any internal applications and tools to get insights regarding the system issues and to resolve issues regardless of whether the operator is currently at home or the office and connected to high-speed internet.

The system receives an indication of an issue associated with the 5G wireless telecommunication network and an indication of an operator capable of resolving the issue. The issue can be associated with a base station of the 5G wireless telecommunication network. The base station can include a sensor providing a first measurement associated with the base station. The sensor can be a camera or a sensor obtaining a measurement.

The system can send a notification to the AR glasses associated with the operator, where the notification indicates the issue and prompts the operator to join a virtual collaboration room. The system can receive a request to join the virtual collaboration room from the operator based on a gesture or a voice command detected by the AR glasses. The system can authenticate the operator using biometric authentication, such as face, fingerprint, voice, or cornea authentication, among others.

The system can create the virtual collaboration room including a screen shared among multiple operators and a visualization based on the first measurement provided by the sensor associated with the base station. The sensor is a camera, though various imaging devices (e.g. LIDAR) or other sensors can alternatively or additionally be used. The visualization can be a video feed, or if the sensor provides a measurement, the visualization can be a rendering of the provided measurement. Each operator among the multiple operators can interact with the screen while being physically distant from each other. The virtual collaboration room can enable interaction using gesture and voice commands. The virtual collaboration room can include a breakout room enabling a subset of the multiple operators to collaborate. The system can record operations performed in the virtual collaboration room until a resolution to the issue has been determined.

The system can receive a continuous feed of multiple steps associated with resolving the issue, where the multiple steps include an instruction communicated via voice, an instruction communicated via hand movement, an instruction communicated via typing, or an instruction communicated via selection. The system can record the continuous feed of the multiple steps to obtain a recording. The system can receive an indication from an operator among the multiple operators that the issue has been resolved and to log a resolution of the issue. Upon receiving the indication from the operator, the system can stop the recording of the continuous feed of the multiple steps. The system can store the recording of the continuous feed of the multiple steps, an indication of the issue, and an indication of one or more operators involved in resolving the issue in a database. Based on the issue and the one or more operators, the system can determine a historical success rate in resolving the issue associated with each operator among the one or more operators. The system can receive an indication of a second issue associated with the 5G wireless telecommunication network, where the second issue is similar to the issue. The system can retrieve from the database the success rate of resolving the issue associated with each operator. Based on the success rate of resolving the issue associated with each operator, the system can send a second notification to second AR glasses associated with each operator.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, operator authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. A small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively small geographic area and can allow unrestricted access by wireless devices that have service subscriptions with the network 100 provider. A femto cell covers a relatively small geographic area (e.g., a home) and can provide restricted access by wireless devices having an association with the femto unit (e.g., wireless devices in a closed subscriber group (CSG) or wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless AR/VR connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as user equipment (UE), customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, operator data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between the base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
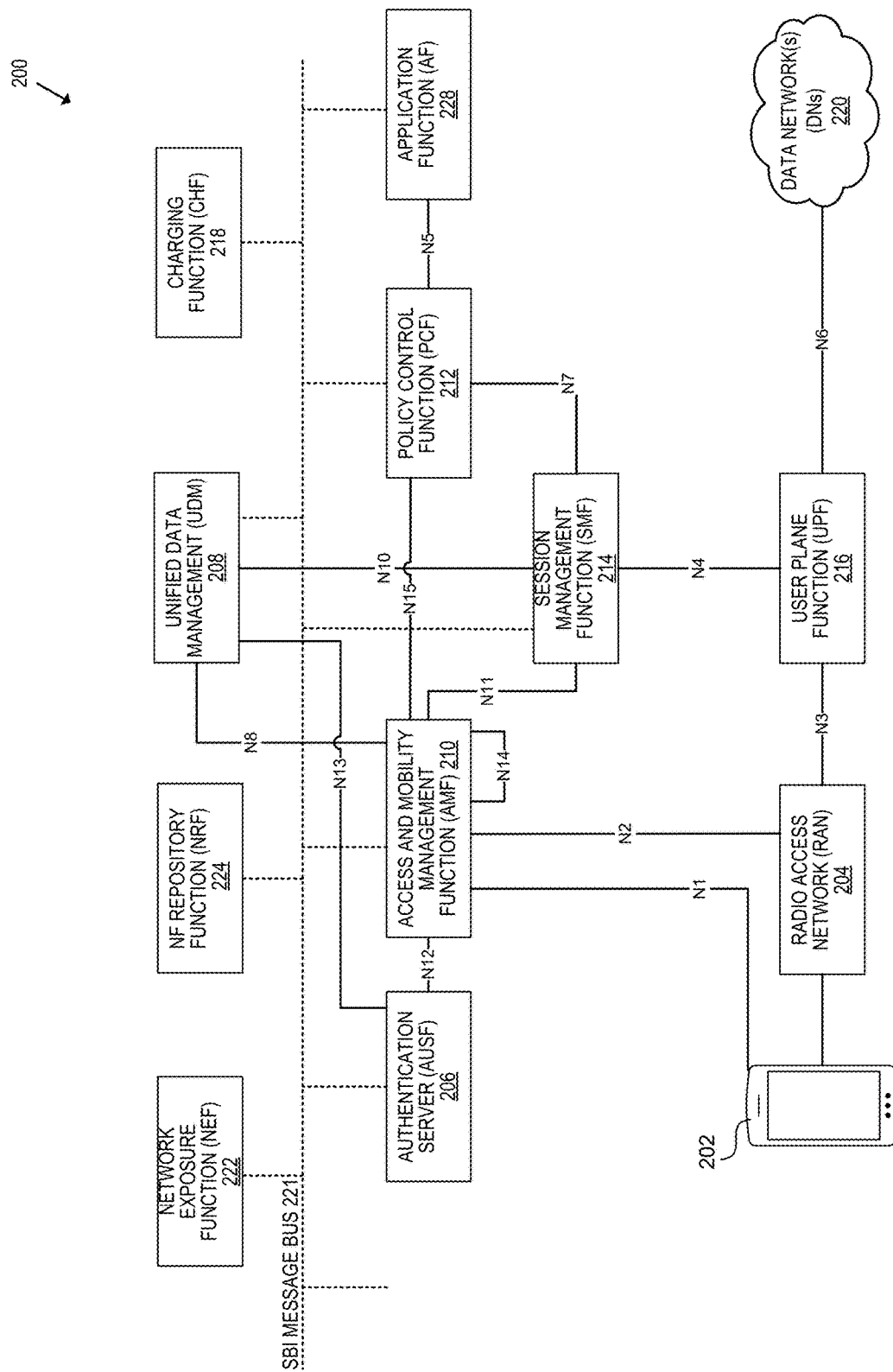
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane, and the AMF 210, SMF 214, PCF 212, AUSF 206, and UDM 208 are part of the control plane. One or more UPFs can connect with one or more data networks (DNs) 220. The UPF 216 can be deployed separately from the control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe to and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and it includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), in that it provides authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network user's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical Quality of Service (QoS) and charging rules, includes network slice selection, which is regulated by the NSSF 226.

Figure 3:
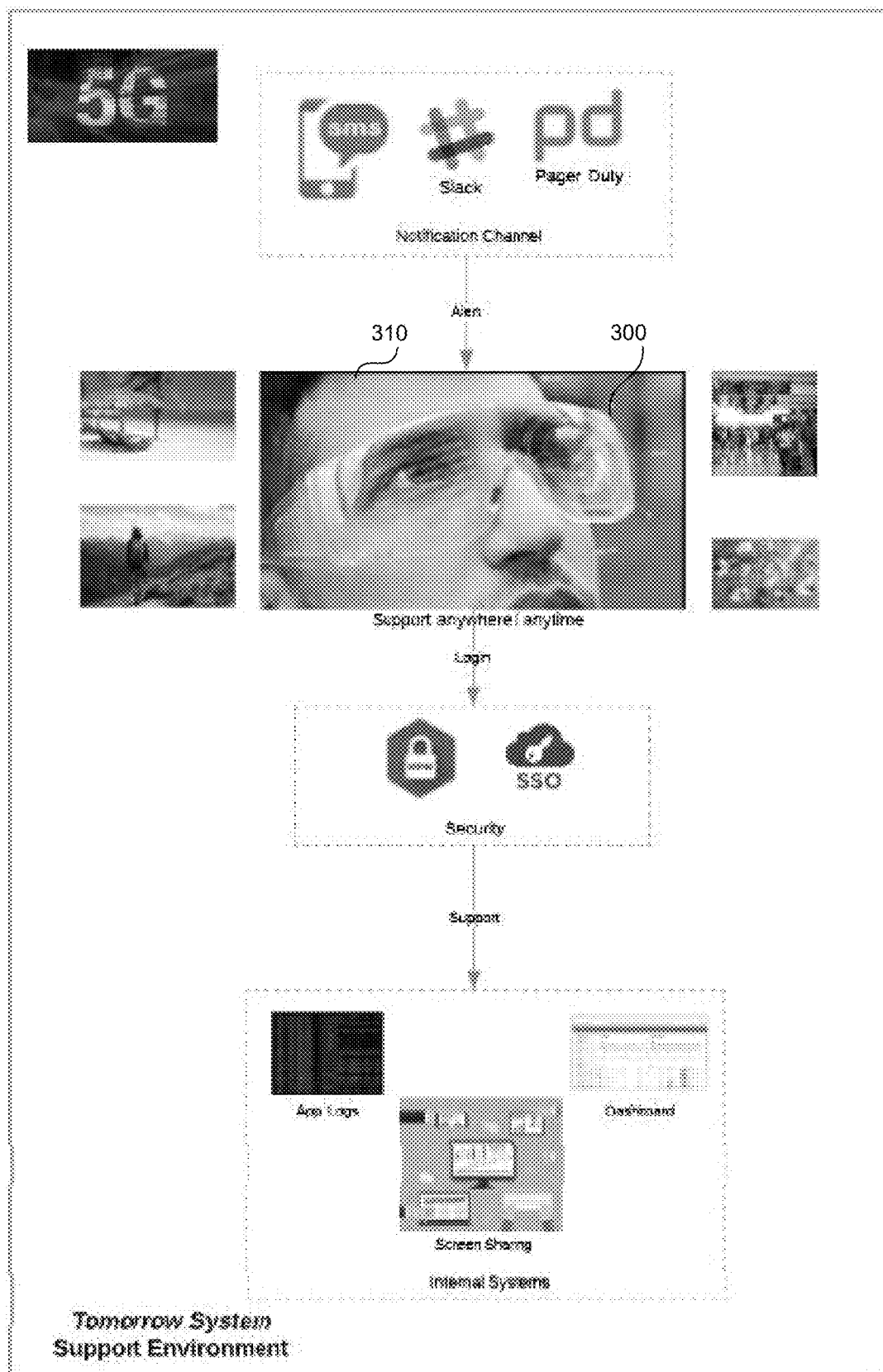
FIG. 3 shows examples of the augmented reality (AR)/virtual reality (VR) device that an operator can use to be notified when network issues arise.

Enabling an Operator to Resolve an Issue Associated with a 5G Wireless Telecommunication Network Using AR/VR Glasses FIG. 3 shows examples of the AR/VR device 300 that an operator 310 can use to be notified when network issues arise. The AR/VR device 300 can be AR glasses. As mentioned above, traditionally, operators must remain physically close to computers with high-speed internet to be able to resolve network issues. Network issues can be issues with the 5G network 100 in FIG. 1 or an earlier generation network, such as a 4G network, a 3G network, a 2G network, etc. The operator 310 can be an artificial intelligence (AI) machine learning (ML) model or a person.

With the 5G wireless telecommunication network 100, operators 310 can obtain high bandwidth even while they are not physically close to a computer with high-speed internet. In addition, the AR/VR device 300 is small and light (smaller and lighter than a laptop) and can be carried on a quick lap run in the early morning or evening, during a trip into a grocery store, on a vacation, etc. Using the 5G network 100, which provides access to the high-speed internet, operators can log onto the company network and have any supported applications available to access.

Figure 4:
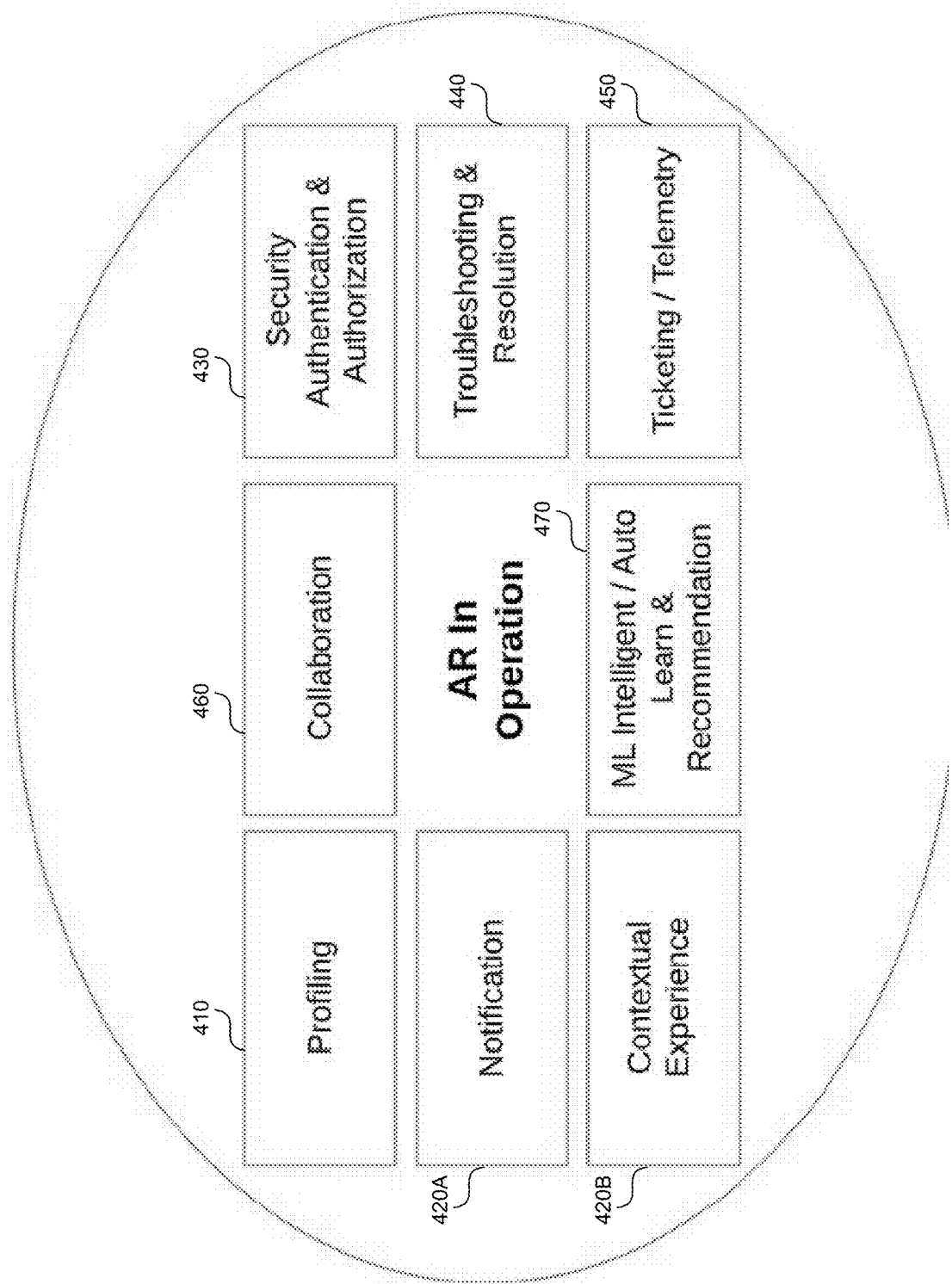
FIG. 4 shows modules and capabilities associated with the disclosed system.

FIG. 4 shows modules and capabilities associated with the disclosed system. The system 400 can include a profiling module 410, notification module 420A and contextual experience module 420B ("notification module 420"), security authentication and authorization module 430, troubleshooting and resolution module 440, ticketing/telemetry module 450, collaboration module 460, and machine learning (ML) module 470. Each of the modules is described below.

Figure 5:
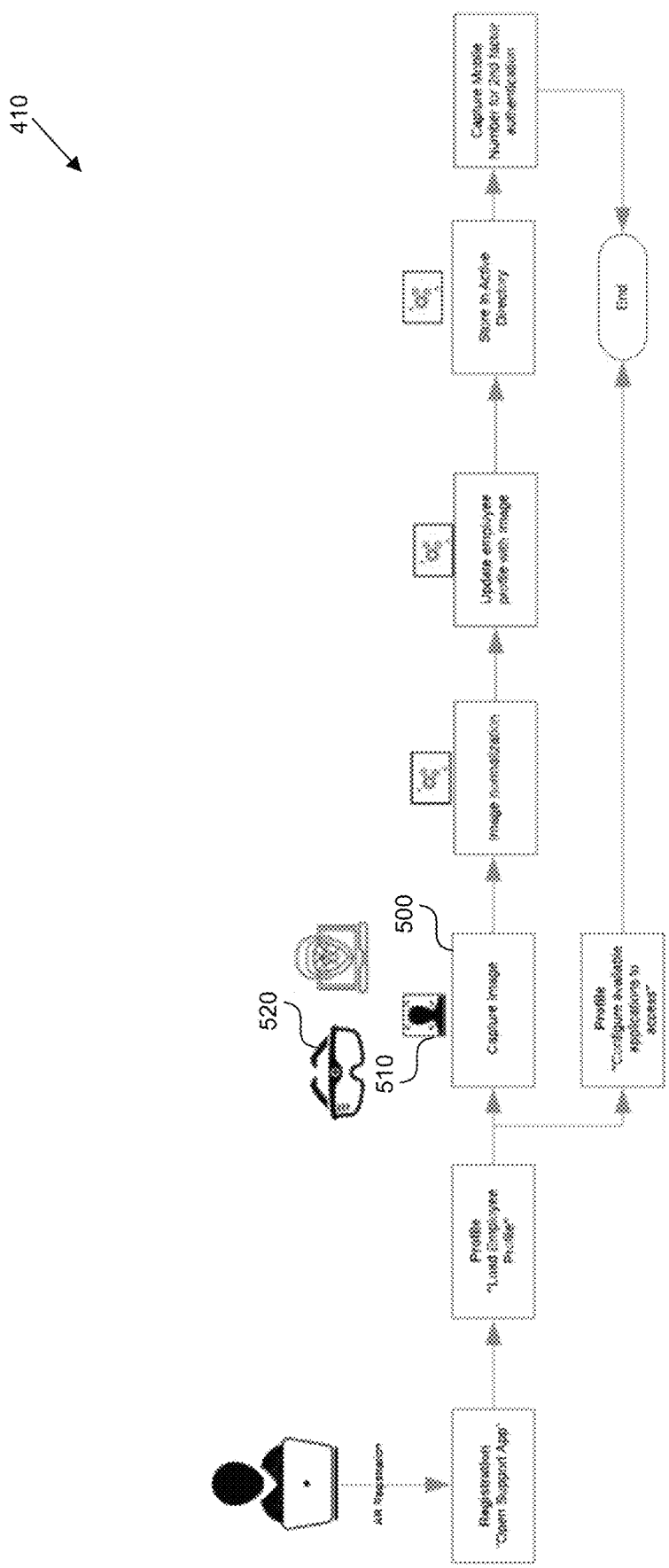
FIG. 5 shows the profiling module that is used to onboard operators into the disclosed system.

FIG. 5 shows the profiling module 410 that is used to onboard operators into the disclosed system. To onboard operators, in step 500, the profiling module 410 captures a biometric identifier 510 such as an image of a face, a retina, a fingerprint, etc. The biometric identifier 510 is stored along with an operator login identifier on the company's active directory. Operators can be authenticated on the company network by providing a network identifier (ID) and password or a biometric identifier such as a face or a retina. The AR/VR device 520 can perform the biometric authentication. The operators can both be operators of the network 100 in FIG. 1, as well as troubleshooters for the network 100.

The system can configure permissions to allow an operator access to a set of applications available to use when accessing the system via AR/VR device 520. It is important to limit what each operator can access to avoid giving access to unlimited resources.

The system can determine which applications the operator has access to based on the operator's qualifications and historical success rate in resolving previous issues. The system can create an operator profile indicating which issues the operator is capable of resolving, and based on the profile, the system can grant access to applications needed to resolve the issues that the operator is capable of resolving. Similarly, based on ticketing/telemetry module 450 in FIG. 4, the system can determine which operators are capable of resolving which issues. Consequently, the system enables operator access to appropriate applications configured to aid in resolving issues that the operator is capable of resolving. Through existing system telemetry and configuration, when a system is predicted to soon have a problem or is currently experiencing an issue, the operator profile enables the system to identify all operators that need to be involved in resolving the issue, and which operators need to be involved using AR capabilities.

In addition, the system can categorize the issues by urgency. For example, the system can categorize an issue as Tier 1 (critical) or Tier 2 (less critical) and can assign particular applications and operators based on the category of the issue.

Figure 6:
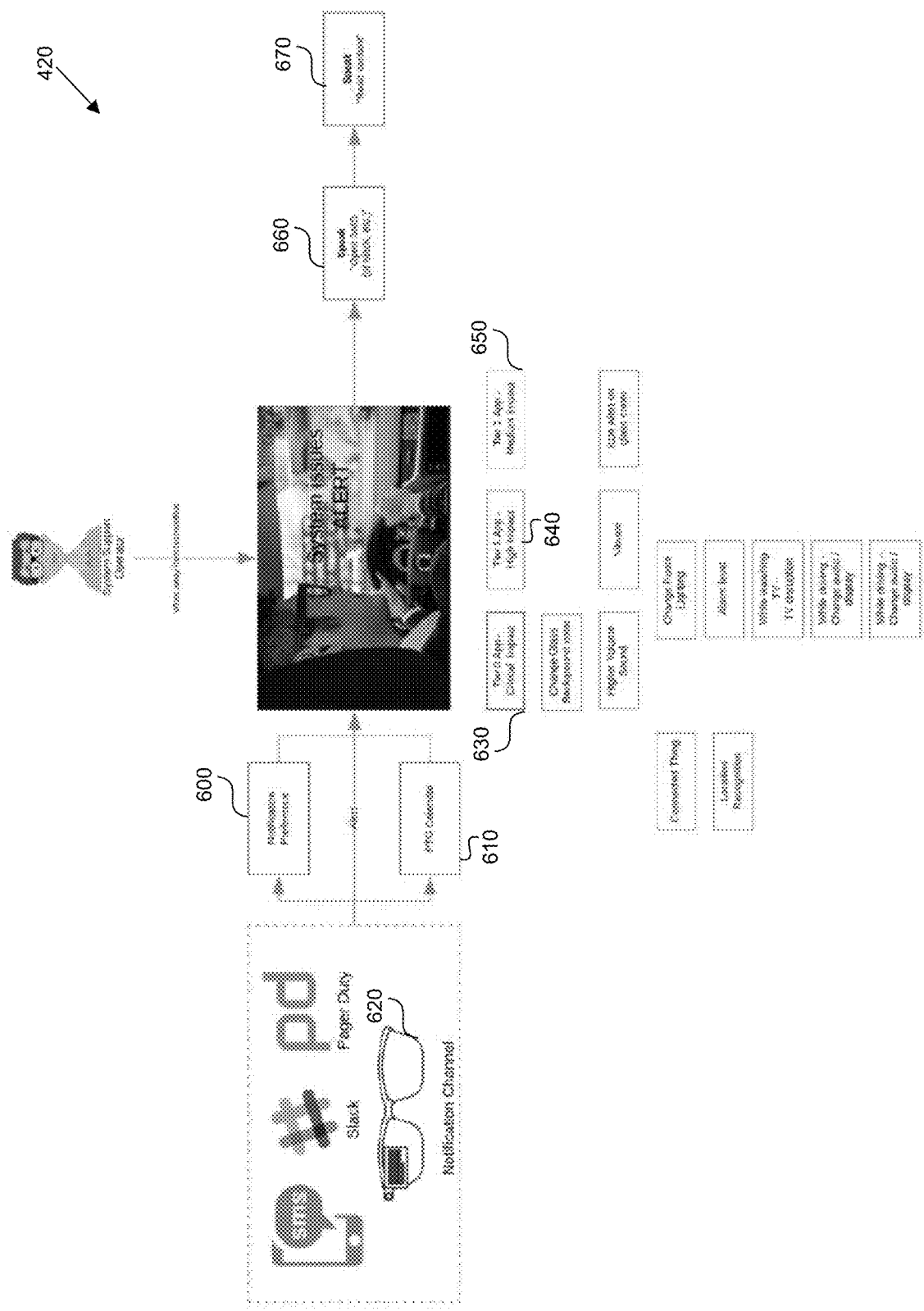
FIG. 6 shows the notification module guiding delivery of system notifications.

FIG. 6 shows the notification module 420 guiding delivery of system notifications. How an operator receives a notification is based on issue tiers 630, 640, 650, notification preferences 600, calendars 610, and the current operator environment. For example, the notification module 420 can have access to the operator's calendar 610, allowing the notification module to notify operators appropriately.

Since AR/VR device 620 can always be with the operator and anywhere the operator is, the notification module 420 can recognize the operator's surroundings and generate an appropriate notification based on the surroundings.

The notification module 420 can determine the operator's location and, based on the location, generate an appropriate level of alert. For example, when the operator is asleep at home, the notification module 420 can generate a loud notification to alert the operator. In another example, if the operator is in a church, the alert level will be adjusted to not disrupt surrounding people. Further, the notification module can have access to the operator's calendar 610 and, based on the calendar, determine the level of alert presented to the operator.

The issue tiers 630, 640, 650 can trump other considerations such as location of the operator and operator surroundings. Issue tier 0 can indicate that the impact of the issue is critical. Issue tier 1 can indicate that the impact of the issue is high, while issue tier 2 can indicate medium impact. For example, even if the operator is in a church, if the issue tier is 0, namely critical, the notification module 420 can issue an audible alert. When the issue tier is 0, the notification module 420 can change the AR/VR device 620 background and/or produce a higher volume sound.

When the issue tier is 0 or 1, the notification module 420 can determine if the operator is in a room and can change the room lighting. The notification module 420 can determine if the operator is watching TV and can cause TV disruption. The notification module 420 can determine if the operator is driving and can change the audio and/or display of the ARNR device 620.

When the issue tier is 1, the notification module 420 can vibrate. When the issue tier is 2, the notification module can display an icon alerting the operator of the issue on the corner of the ARNR device 620.

The operator can interact with the system using speech recognition or gestures. For example, the operator, in step 660, can say "open SMS." In step 670, the operator can speak the words "read content" to cause the notification module 420 to read the content of the notification. The operator has the option to see a screenshot, a summary, or details of the system issues.

Since the 5G network is critical for the ARNR device 620, the operator needs to be within 5G coverage range. Network 100 coverage varies geographically. The ARNR device 620 can alert the operator that the operator is about to lose network capabilities, thus impacting the support level the operator can offer. The ARNR device 620 can guide/alert the operator to the closest network boundary/location with the best 5G coverage.

Figure 7:
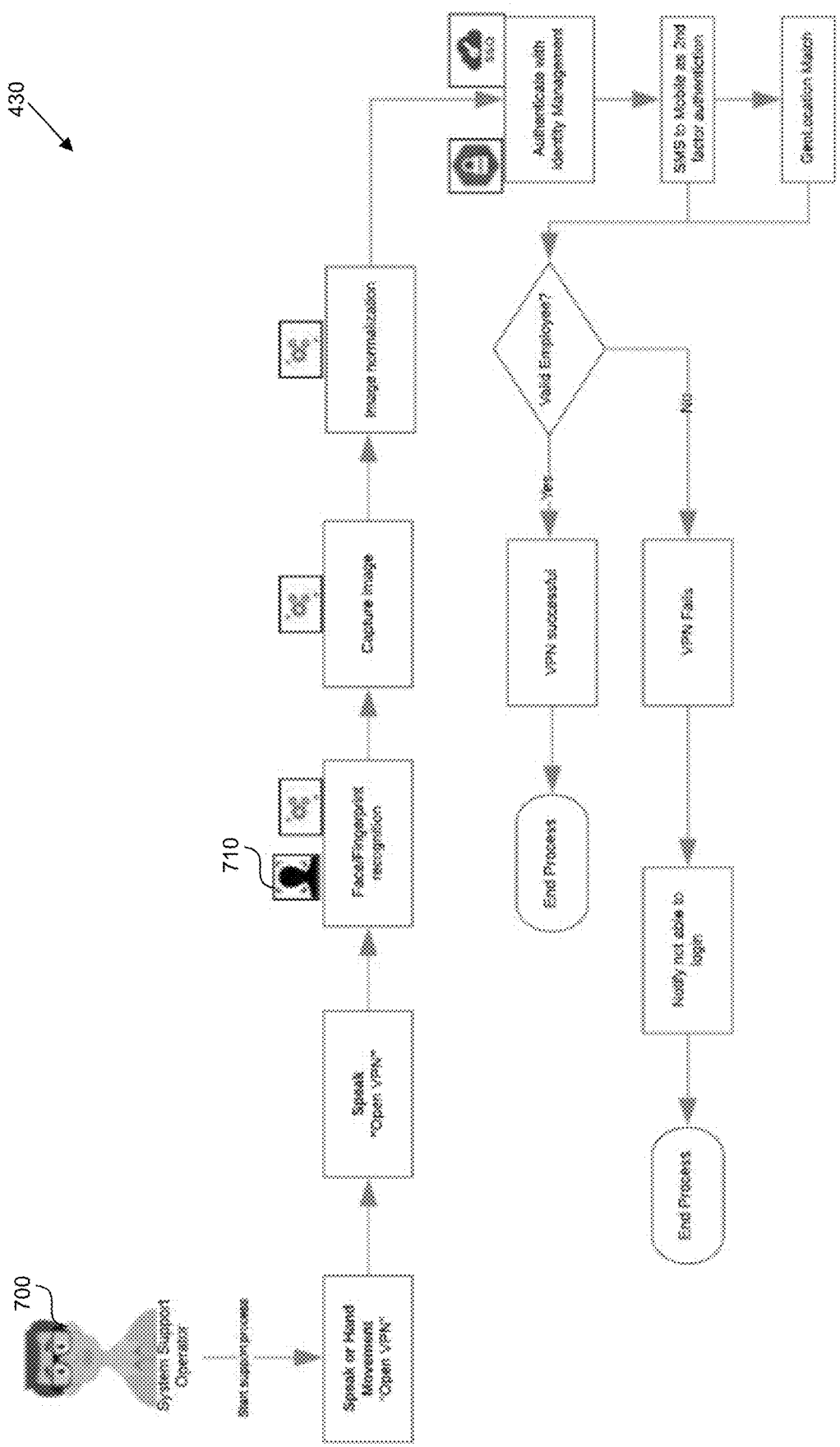
FIG. 7 shows the security authentication and authorization module authenticating the operator prior to granting access to the system.

FIG. 7 shows the security authentication and authorization module 430 authenticating the operator prior to granting access to the system. Using the ARNR device 700, the operator can speak or use hand gestures to open a Virtual Private Network (VPN) to log in to the company network over the 5G network 100. The security authentication and authorization module 430 can authenticate the operator using a biometric identifier 710, such as face, fingerprint, voice, cornea, etc. The security authentication and authorization module 430 can require two-factor authentication. The security authentication and authorization module 430 can send a short message service (SMS) containing a code to a registered UE. The operator may need to input the code in addition to the biometric authentication to gain access to internal company information. When the security authentication and authorization module 430 authenticates the operator, the operator has access to all the applications in his or her profile, as explained herein.

Figure 8:
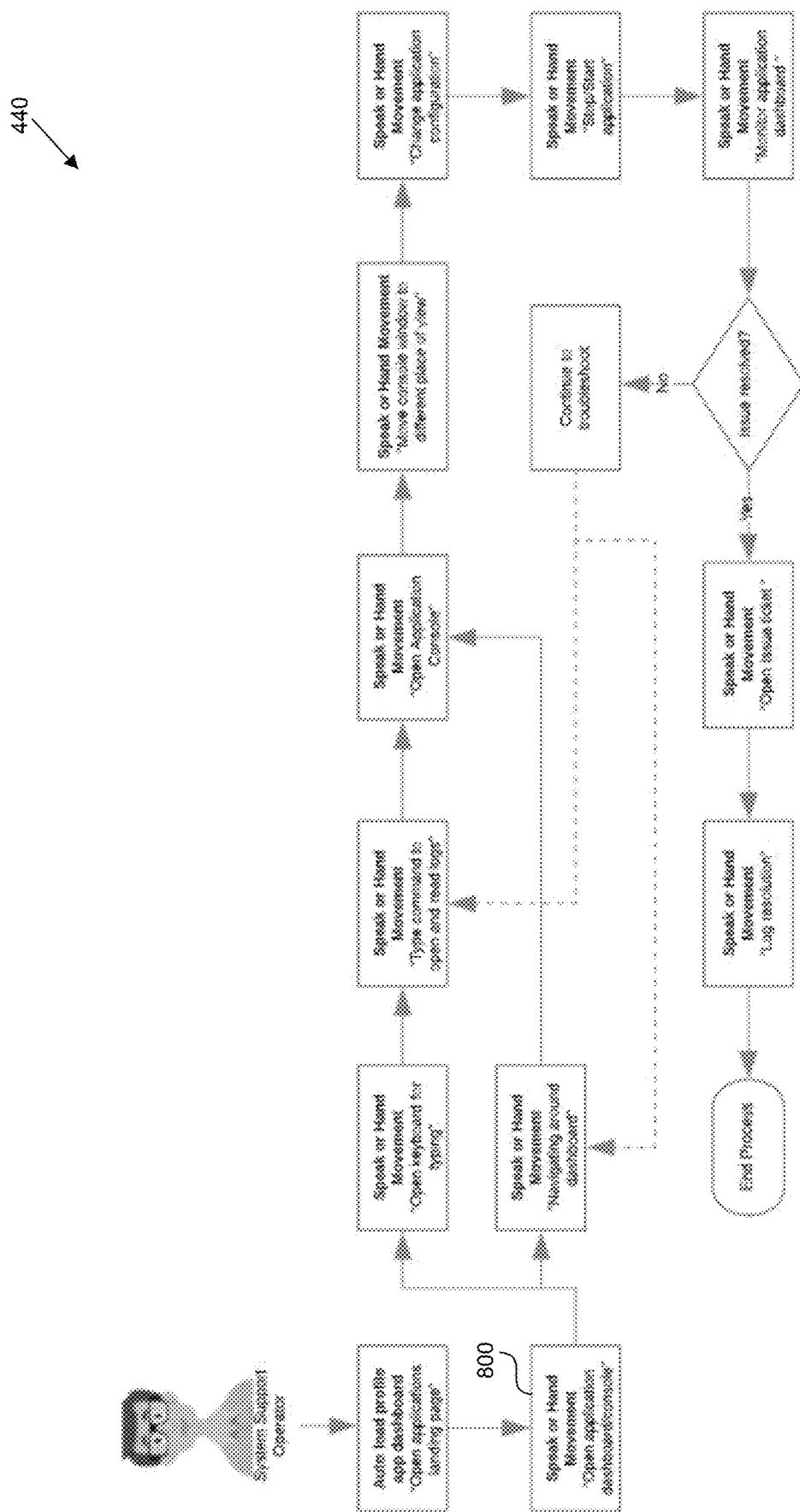
FIG. 8 shows the troubleshooting and resolution module, which enables an operator to access applications that can aid in resolving the issue.

FIG. 8 shows the troubleshooting and resolution module 440, which enables an operator to access applications that can aid in resolving the issue. After the security authentication and authorization module 430 authenticates the operator, the operator can log in to the internal network using a VPN. In step 800, the operator can instruct the troubleshooting and resolution module 440 to load an application dashboard with the list of applications the operator has access to. In one embodiment, the application dashboard can highlight the applications that are prevalent to resolving the reported issue. The operator can interact with the troubleshooting and resolution module 440 using voice and/or gestures.

Figure 9:
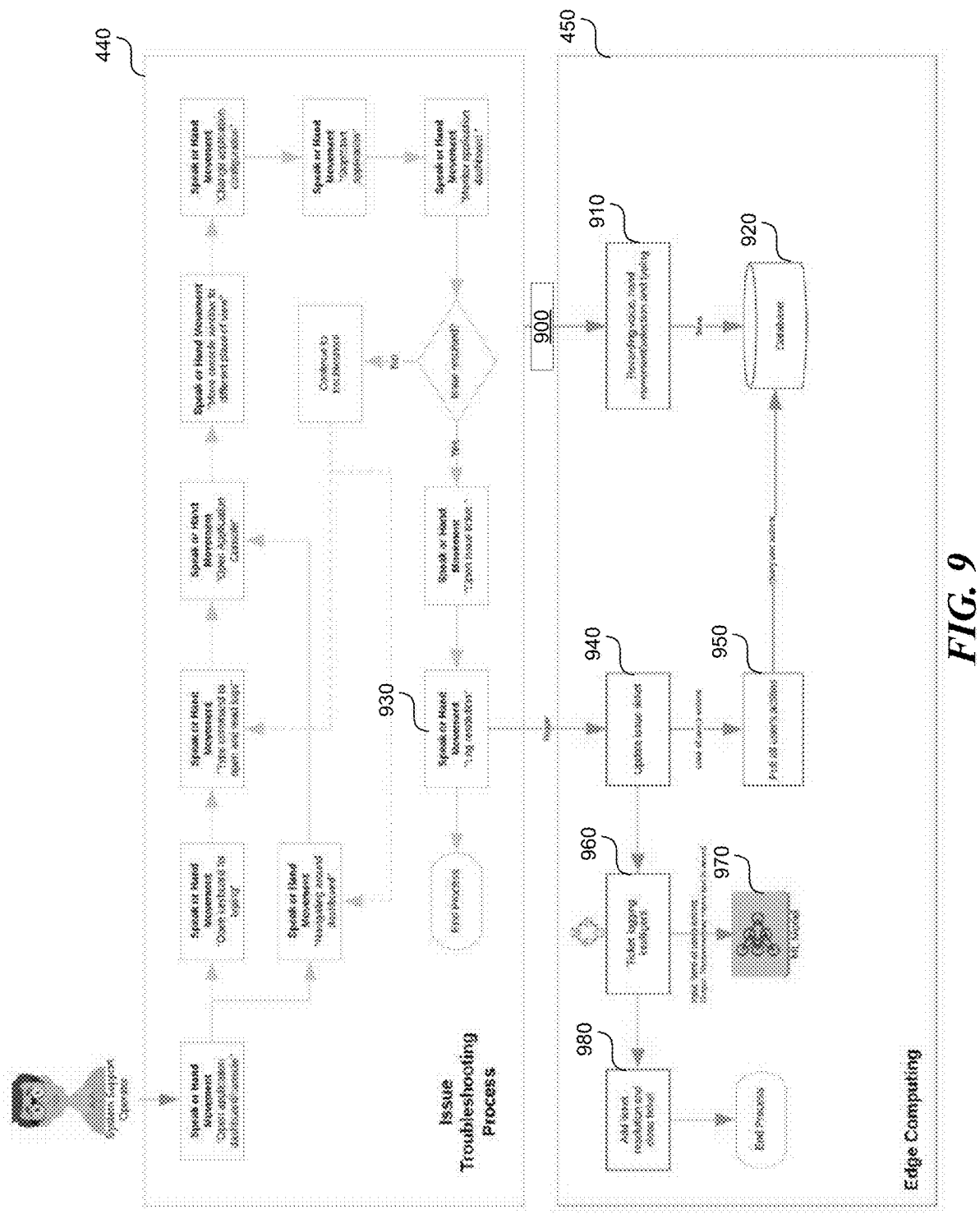
FIG. 9 shows a collaboration between the ticketing/telemetry module and the troubleshooting and resolution module.

FIG. 9 shows a collaboration between the ticketing/telemetry module 450 and the troubleshooting and resolution module 440. The ticketing/telemetry module 450 can automatically capture issues and the resolutions from the troubleshooting and resolution module 440. The ticketing/telemetry module 450 can receive a continuous feed 900 of steps associated with the troubleshooting and resolution module 440. In step 910, the ticketing/telemetry module 450 can record voice, hand movement, selection, and typing associated with the troubleshooting and resolution module 440. The ticketing telemetry module 450 can store the recorded information in a database 920.

In step 930 of the troubleshooting and resolution module 440, when the system issue is resolved, the operator can issue a command to log the resolution of the issue. Once the command is issued, the ticketing/telemetry module 450 in step 940 can update the issue ticket with the resolution of the issue. In step 950, the ticketing/telemetry module 450 can retrieve all the operator's actions from the database 920. In step 960, the ticketing/telemetry module 450 can perform intelligent ticket logging. Specifically, the ticketing/telemetry module 450 can receive as input all of the operator's actions retrieved from the database 920 and can summarize them into a text that can be stored along with the ticket issue and forwarded to other operators as a summary. For example, any voice discussions can be transcribed into text and summarized into topics including keywords, important words, and/or strong words. When the next support operators take over an incomplete issue resolution, they can know what has been done to the system based on the summary.

In step 970, a machine learning model can analyze the issue and the resolution of the issue, as described in this application. In step 980, the issue and the resolution of the issue can be stored. The automatic capturing process is useful not only for troubleshooting tickets but also for future operator training and for providing status updates to leadership throughout the issue resolution process.

Figure 10:
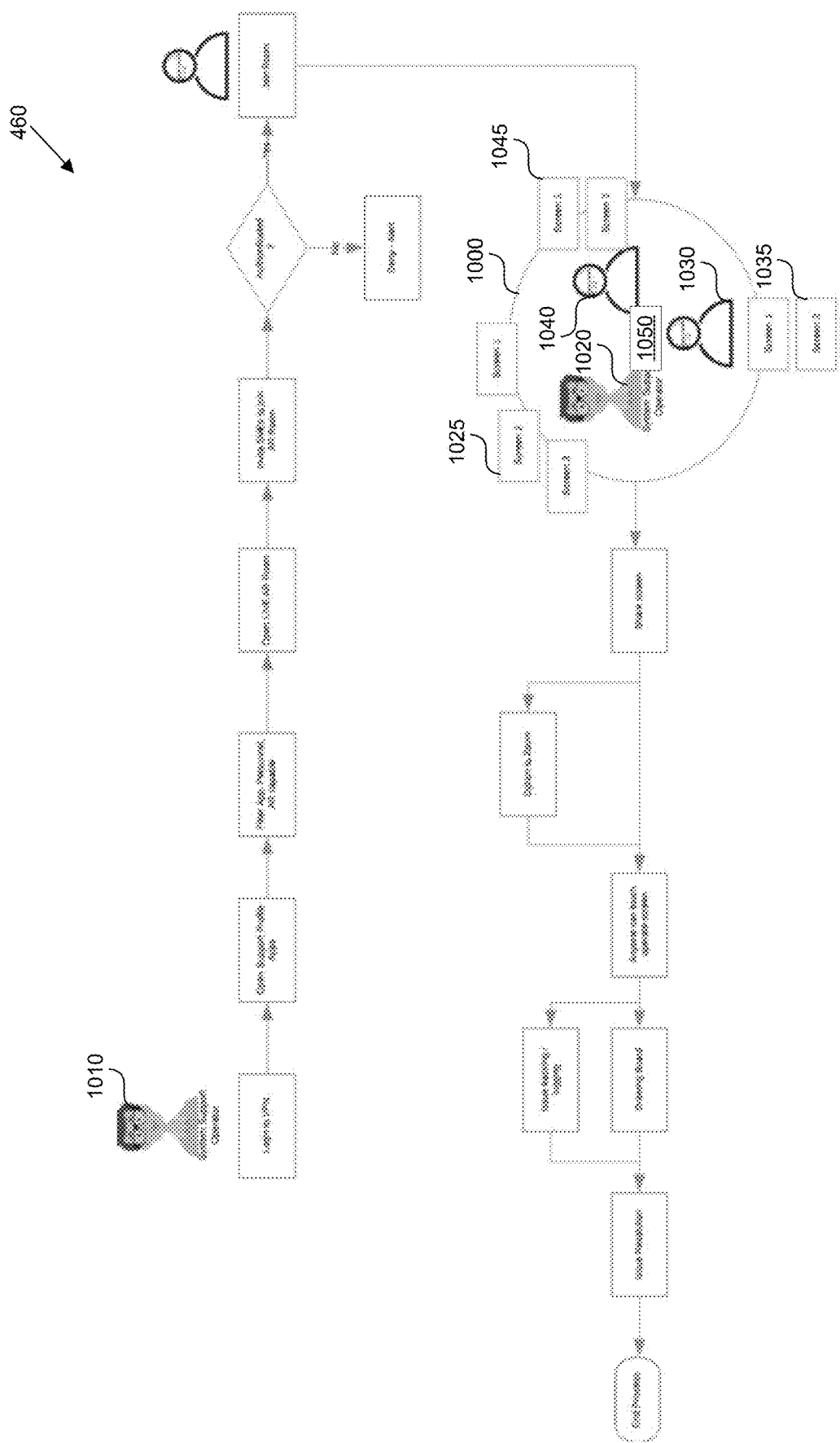
FIG. 10 shows operation of the collaboration module.

FIG. 10 shows operation of the collaboration module 460. When an issue is encountered, the profiling module 410 in FIG. 4 can determine which operators are capable of resolving the issue, as explained herein. The collaboration module 460 can notify each operator of the issue and enable each operator to join a virtual collaboration room 1000 with a single click or a single voice command. The collaboration module 460 can invite every operator who is available and capable of resolving the issue to the collaboration room 1000. In addition, the collaboration module 460 can invite operators capable of resolving related issues to the collaboration room 1000. Today, this process of gathering operators in a conference call takes a minimum of 30 minutes. By contrast, the disclosed system can gather the relevant operators in a matter of just a few minutes.

The collaboration room 1000 can be partly physical and partly virtual. The collaboration room 1000 can include three-dimensional virtual spaces where operators can congregate. By contrast, today's videoconferences enable interaction via a two-dimensional interface, and the operators cannot operate on the same dashboard.

The meeting owner can invite anyone with an AR/VR device 1010 to join the collaboration room 1000 after being authenticated successfully. Each operator 1020, 1030, 1040 can have a dedicated screen 1025, 1035, 1045, respectively, that the operator 1020, 1030, 1040 can drag into the collaboration room 1000 to share with the group. Anyone in the collaboration room 1000 can operate on the shared screen 1050 or whiteboard. The shared screen 1050 can be zoomed in/out to allow operators 1020, 1030, 1040 to better see the screen. In addition, each operator 1020, 1030, 1040 can independently zoom in and out of the shared screen 1050 to adjust their individual view.

Multiple screens 1025, 1035, 1045 can be shared for all to view. Each operator 1020, 1030, 1040 can operate on a different screen, but all operators can see what is being worked on by other operators in the collaboration room 1000. This divide-and-conquer process allows faster resolution of the issues.

Operators 1020, 1030, 1040 can have different breakout rooms with options to move one or multiple shared screens into the breakout room. Operators 1020, 1030, 1040 can move back and forth within these rooms. The operators 1020, 1030, 1040 can solve issues in the collaboration room 1000 or in breakout rooms and then meet in the collaboration room 1000 to share results.

In one embodiment, the AR/VR device 1010 can enable an on-site operator to collaborate with a remote operator. The on-site operator can have a camera mounted on his or her AR/VR device and can provide a visual feed of the on-site hardware to the collaboration room 1000. The collaboration room 1000 can allow the remote operator to see the site, equipment, and hardware to help diagnose the issue as if the remote operator was on-site. The on-site operator can be a junior operator, while the remote operator can be a senior operator, and the collaboration room can facilitate learning by enabling the remote operator to teach the junior operator.

In another embodiment, the issue can be associated with a particular base station that can have a mounted camera. The camera can provide a video recording to the collaboration room 1000 for the operators 1020, 1030, 1040 to analyze. The camera can be remotely actuated, and the operators 1020, 1030, 1040 can remotely control the camera to get a different view of the potential issue. The collaboration room 1000 can support multiple video feeds from a mounted camera or an on-site operator and can show the multiple video feeds side-by-side for the operators 1020, 1030, 1040 to examine. For example, at least one video feed can show the hardware experiencing an issue, and at least one video feed can show hardware that is serving the same function but not experiencing the issue. That way, the operators 1020, 1030, 1040 can compare the hardware experiencing the issue to the hardware serving the same function but not experiencing the issue.

In a third embodiment, the issue can be associated with a particular base station that can have mounted sensors that do not provide a video output but do provide measurements. The collaboration module 460 can receive the measurements provided by the mounted sensors and can create a 3D rendering based on the measurements. The collaboration module 460 can present the 3D rendering in the collaboration room 1000.

All the communications associated with the disclosed system, including the communications associated with the collaboration room 1000, can be carried over the 5G network 100 because the 5G network provides high bandwidth and low latency communication. In addition, the 5G network 100 can prioritize the communication associated with the collaboration room 1000 or other network traffic. For example, the 5G network 100 can prioritize the communication based on the tier of the issue, as described in this application. The higher the tier, the higher the prioritization of the communication.

The collaboration module 460 can record all operations within the collaboration room 1000. The ticketing/telemetry module 450 in FIG. 4 can store the recordings for further analysis and retrieval.

Figure 11:
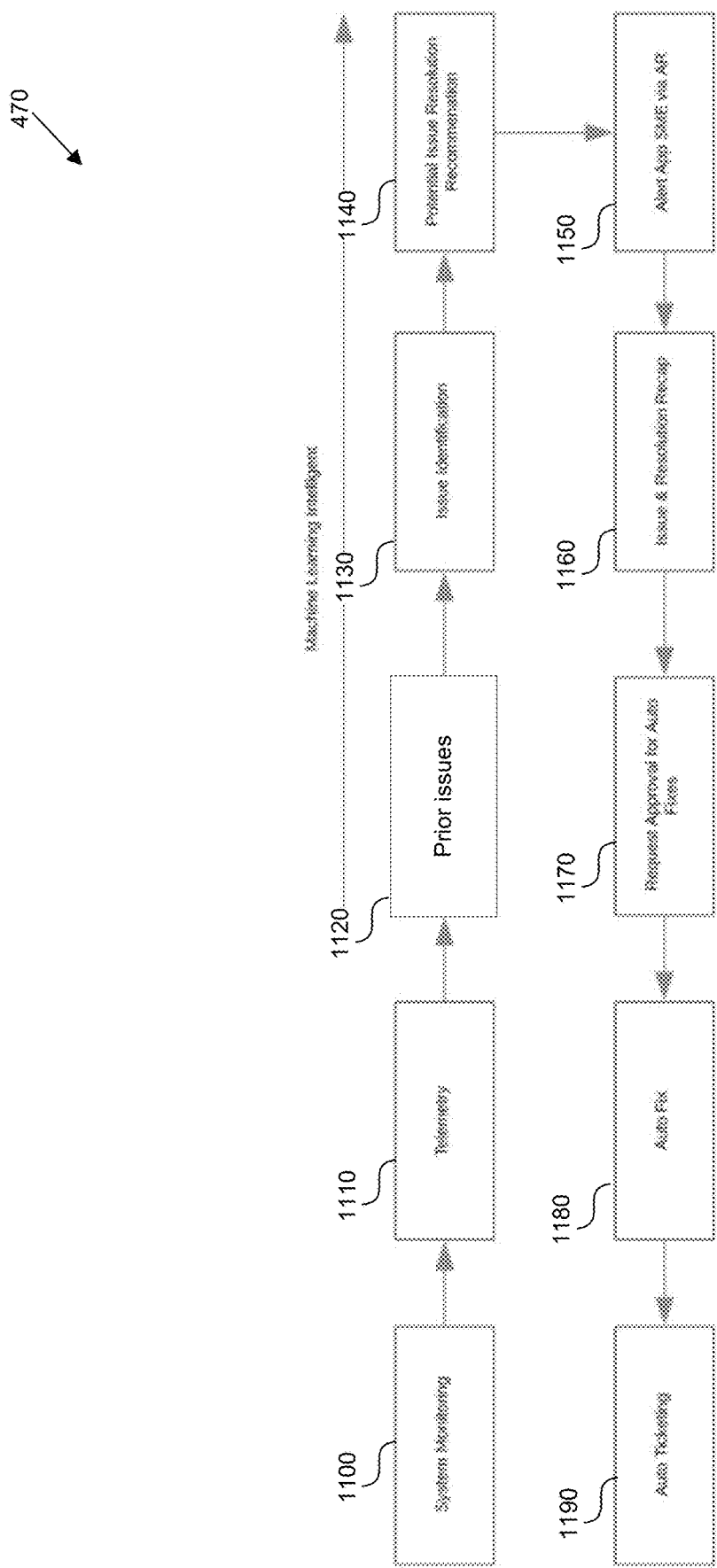
FIG. 11 shows how the machine learning (ML) module can aid in issue recognition.

FIG. 11 shows how the ML module 470 can aid in issue recognition. The disclosed system in step 1100 can monitor the network 100 in FIG. 1. In step 1110, the system can record the measurements obtained from the network 100. In step 1120, the ML module 470 can receive the measurements obtained from the network 100 as well as prior issues recorded by the ticketing/telemetry module 450 in FIG. 4. In step 1130, based on the measurements obtained from the network 100 and the prior issues recorded by ticketing/telemetry module 450, the ML module 470 can identify whether there any issues occurring with the network 100. If the ML module 470 identifies issues occurring within the network 100, in step 1140, the ML module 470 can suggest a solution to the issue based on the prior issues and their resolutions recorded by the ticketing/telemetry module 450.

In step 1150, the system can alert an operator. In step 1160, the system can suggest the resolution identified by the ML module 470. In step 1170, the system can request an approval from the operator to implement the resolution suggested by the ML module 470. Upon receiving the approval, in step 1180, the system can implement the resolution. Finally, in step 1190, the ticketing/telemetry module 450 can record and store the steps performed to resolve the issue.

Figure 12:
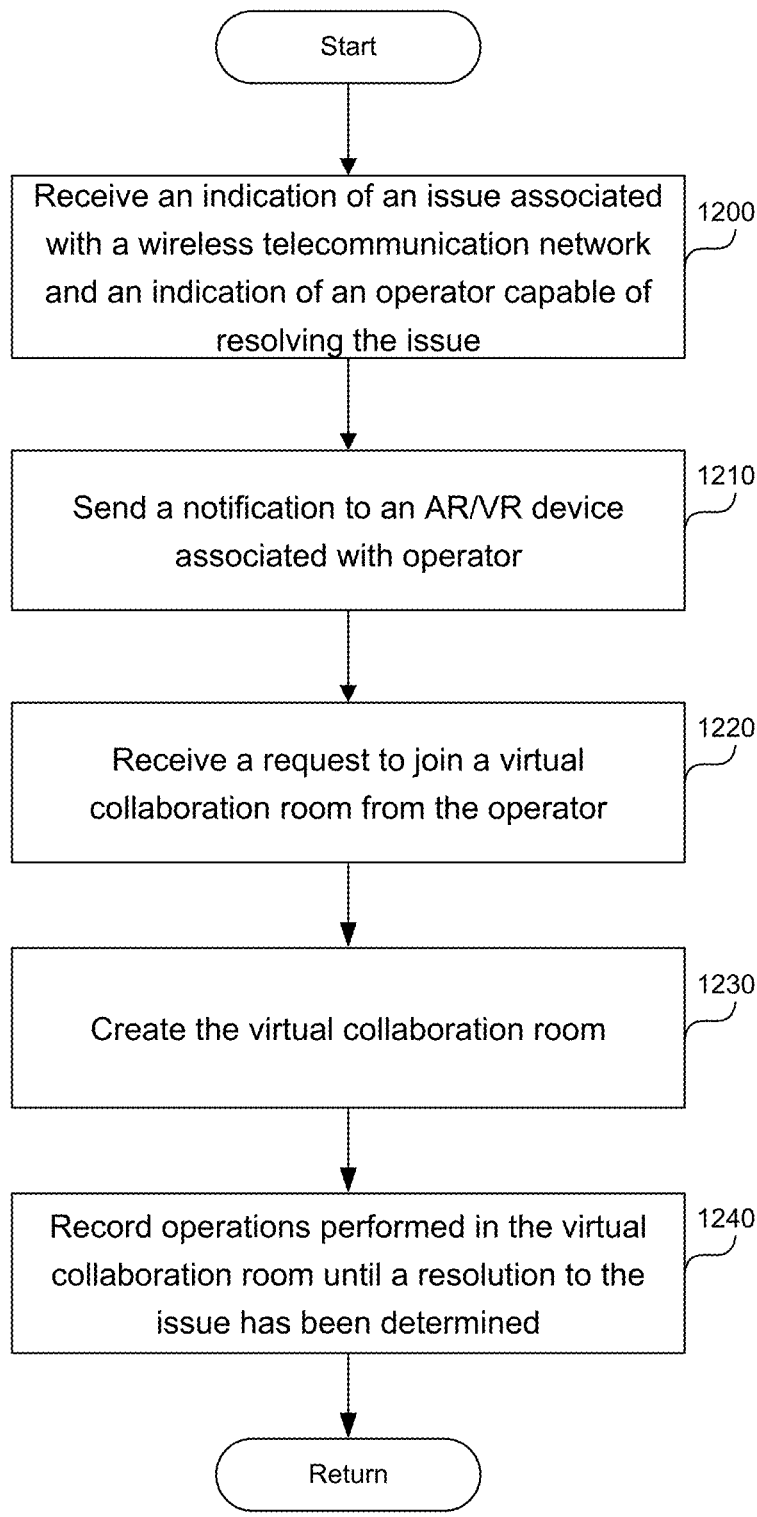
FIG. 12 is a flowchart of a method to enable an operator to resolve an issue associated with a wireless telecommunication network using an AR/VR device.

FIG. 12 is a flowchart of a method to enable an operator to resolve an issue associated with a wireless telecommunication network using an AR/VR device. In step 1200, a hardware or software processor executing the instructions described in this application can receive an indication of an issue associated with a wireless telecommunication network and an indication of an operator capable of resolving the issue. The wireless telecommunication network experiencing the issue can be a 5G, 4G, 3G, 2G, etc., wireless telecommunication network. The issue can be associated with a base station of the wireless telecommunication network, where the base station includes a sensor providing a first measurement associated with the base station. The sensor can be a camera recording a video feed or a sensor obtaining the first measurement. The camera can record an image of the base station, and the system can detect the base station malfunction from the image, such as when weather breaks the equipment. The camera can also enable a remote technician to look at the base station in real time. A technician on-site can carry a camera (such as a camera mounted on the technician's helmet), thus providing a live view of the base station to a technician in the office or in the virtual collaboration room.

In step 1210, the processor can send a notification to an AR/VR device associated with the operator, where the notification indicates the issue and prompts the operator to join a virtual collaboration room.

In step 1220, the processor can receive a request to join the virtual collaboration room from the operator based on a gesture or a voice command detected by the AR/VR device. The processor can authenticate the operator using biometric authentication, such as fingerprint, face, cornea, or voice authentication, etc.

In step 1230, the processor can create the virtual collaboration room, via a 5G wireless telecommunication network, including a screen shared among multiple operators. The communication associated with the virtual collaboration room is communicated via a 5G or higher generation wireless telecommunication network because the communication requires bandwidth and low latency available only through 5G or higher generation wireless telecommunication networks. Each operator among the multiple operators can interact with the screen. In addition, the virtual collaboration room can include a visualization based on the first measurement provided by the sensor associated with the base station. If the sensor is a camera, the visualization can be the video feed provided by the camera. If the sensor is not a camera, the visualization can be a rendering, such as a 3D rendering, of the measurements obtained by the sensor.

The multiple operators in the virtual collaboration room can be physically distant from each other. The virtual collaboration room can enable interaction using gestures and voice commands. The virtual collaboration room can include a breakout room enabling a subset of the multiple operators to collaborate.

In step 1240, the processor can record operations performed in the virtual collaboration room until a resolution to the issue has been determined.

The processor can select the operators to invite into the room based on the historical success rate in resolving similar issues. The processor can receive a continuous feed of multiple steps associated with resolving the issue, where the multiple steps can include an instruction communicated via voice, an instruction communicated via hand movement, an instruction communicated via typing, and an instruction communicated via selection. The processor can record the continuous feed of the multiple steps to obtain a recording. The processor can receive an indication from an operator among the multiple operators that the issue has been resolved and to log a resolution of the issue. Upon receiving the indication from the operator, the processor can stop the recording of the continuous feed of the multiple steps. The processor can store the recording of the continuous feed of the multiple steps, the issue, and an indication of one or more operators involved in resolving the issue in a database. Based on the issue and the one or more operators, the processor can determine a historical success rate in resolving the issue associated with each operator among the one or more operators. The processor can receive an indication of a second issue associated with the wireless telecommunication network, where the second issue is similar to the issue. The processor can retrieve from the database the success rate of resolving the issue associated with each operator. Based on the success rate of resolving the issue associated with each operator, the processor can send a second notification to a second ARNR device associated with each operator. Effectively, the processor can select the most successful operators that are available. The processor can determine the availability of operators based on the location of each operator and/or the calendar associated with each operator.

The sensor providing the feed to the virtual collaboration room can be remotely controlled. The processor can receive from an operator among the multiple operators an instruction to move the sensor associated with the base station. The processor can cause the sensor associated with the base station to move to a new position. Based on the new position, the processor can cause the sensor to gather a second measurement. The processor can create a second visualization of the second measurement and provide the second visualization to the virtual collaboration room.

The processor can prioritize network traffic associated with the virtual collaboration room. The processor can determine a tier associated with the issue, where a first tier indicates a high-priority issue and a second tier indicates a low-priority issue. Based on the tier, the processor can prioritize network traffic carried by the 5G wireless telecommunication network and associated with the issue over other network traffic.

The processor can receive a continuous feed of multiple steps associated with resolving the issue, where the multiple steps include an instruction communicated via voice, an instruction communicated via hand movement, an instruction communicated by typing, and an instruction communicated via selection. The processor can record the continuous feed of the multiple steps to obtain a recording. The processor can receive an indication from an operator among the multiple operators that the issue has been resolved and to log a resolution of the issue. Upon receiving the indication from the operator, the processor can stop the recording of the continuous feed of the multiple steps. Based on the multiple steps, the processor can create a summary of the multiple steps. The processor can store the recording of the continuous feed of the multiple steps, the issue, and the summary in a database.

The processor can determine an operator location and a tier associated with the issue, where a first tier indicates a high-priority issue, and a second tier indicates a low-priority issue. Based on the operator location, the processor can obtain an operator preference regarding a notification to send to the operator when the operator is at the operator location. Based on the operator preference and the tier associated with the issue, the processor can send the notification to the AR/VR device associated with the operator, where the notification includes an indication associated with the issue.

The processor can obtain multiple measurements associated with the wireless telecommunication network, multiple issues associated with the wireless telecommunication network and stored in a database, and multiple resolutions associated with the multiple issues. Based on the multiple measurements associated with the wireless telecommunication network and the multiple issues, the processor can determine whether a second issue is occurring, where the second issue is associated with the wireless telecommunication network. Upon determining that the second issue is occurring, the processor can suggest a resolution to the second issue based on the multiple issues and the multiple resolutions associated with the multiple issues. The processor can request an approval from the operator to implement the resolution. Upon receiving the approval from the operator, the processor can implement the resolution. The processor can record the second issue and the resolution.

Figure 13A:
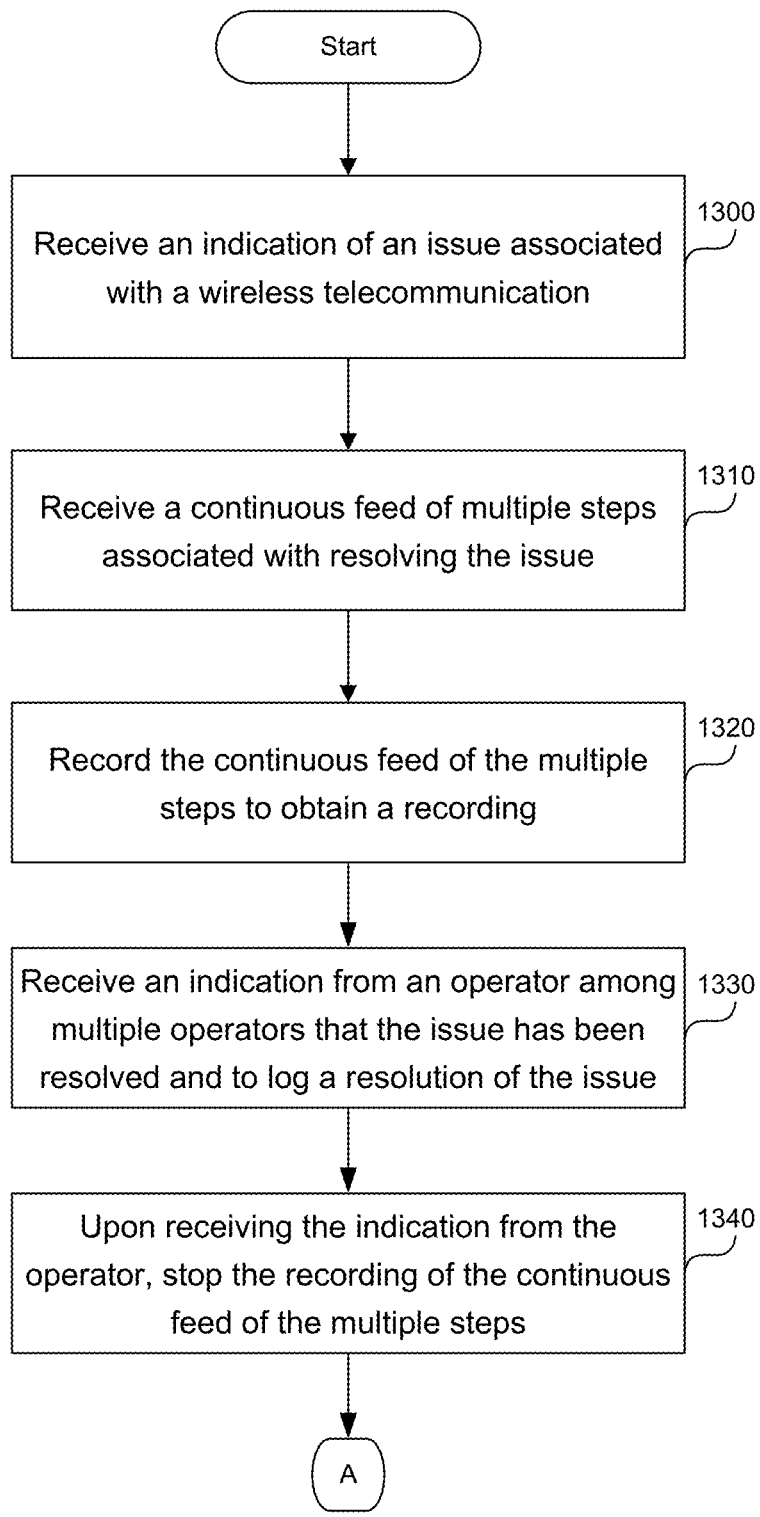
FIGS. 13A-13B depict a flowchart of a method to track the success rate of resolving an issue associated with an operator.
Figure 13B:
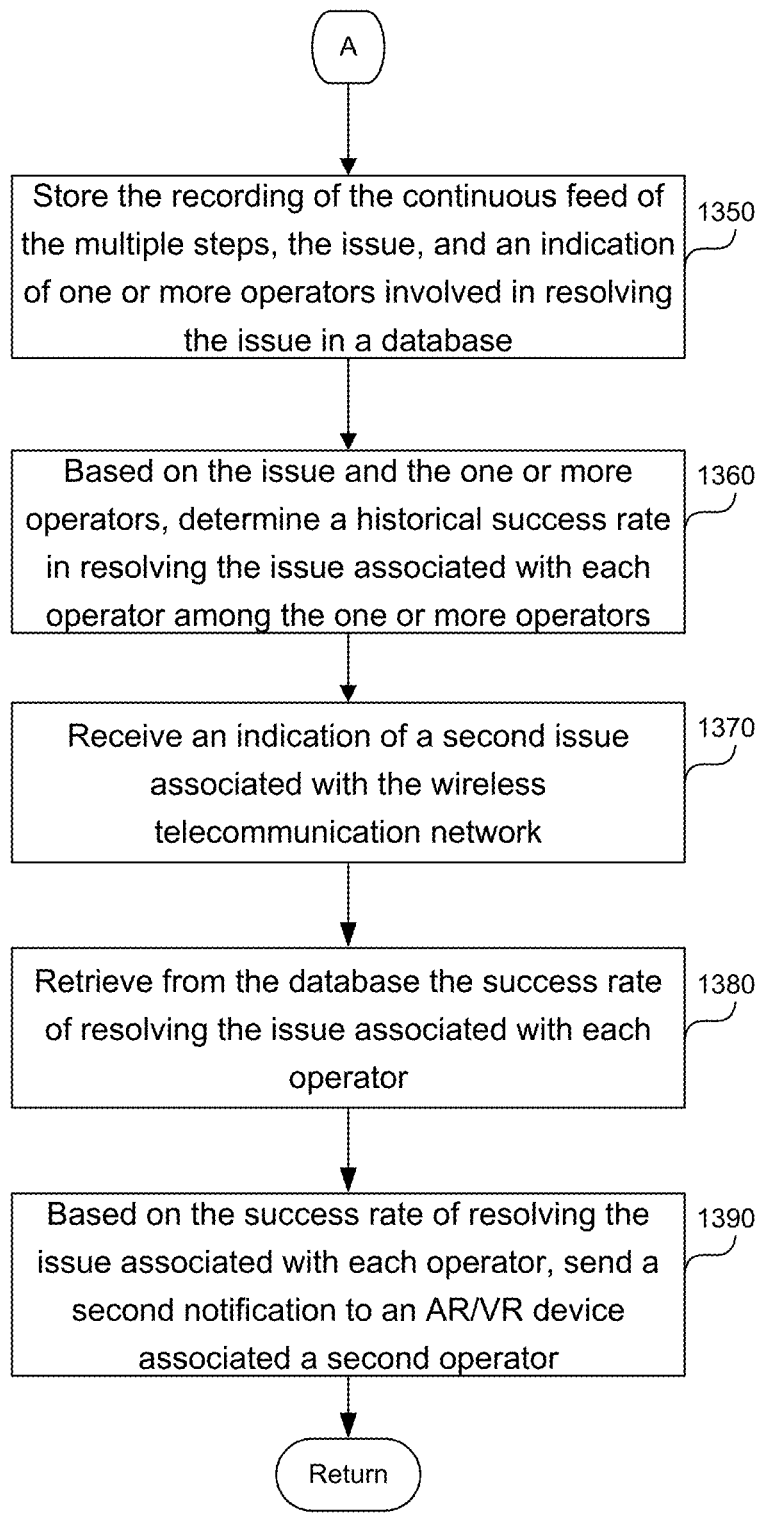

FIGS. 13A-13B depict a flowchart of a method to track the success rate of resolving an issue associated with an operator. In step 1300, the processor can receive an indication of an issue associated with a wireless telecommunication network. In step 1310, the processor can receive a continuous feed of multiple steps associated with resolving the issue, where the multiple steps include an instruction communicated by an operator among multiple operators. The operator among the multiple operators can communicate the instruction via voice, via hand movement, via typing, and via selection.

In step 1320, the processor can record the continuous feed of the multiple steps to obtain a recording. In step 1330, the processor can receive an indication from an operator among multiple operators that the issue has been resolved and to log a resolution of the issue. Upon receiving the indication from the operator, in step 1340, the processor can stop the recording of the continuous feed of the multiple steps.

In step 1350, the processor can store the recording of the continuous feed of the multiple steps, the issue, and an indication of one or more operators involved in resolving the issue in a database. In step 1360, based on the issue and the one or more operators, the processor can determine a historical success rate in resolving the issue associated with each operator among the one or more operators.

In step 1370, the processor can receive an indication of a second issue associated with the wireless telecommunication network, where the second issue is similar to the issue. In step 1380, the processor can retrieve from the database the success rate of resolving the issue associated with each operator. In step 1390, based on the success rate of resolving the issue associated with each operator, the processor can send a second notification to an AR/VR device associated with a second operator. Further, the processor can perform other steps described in this application.

Computer System

Figure 14:
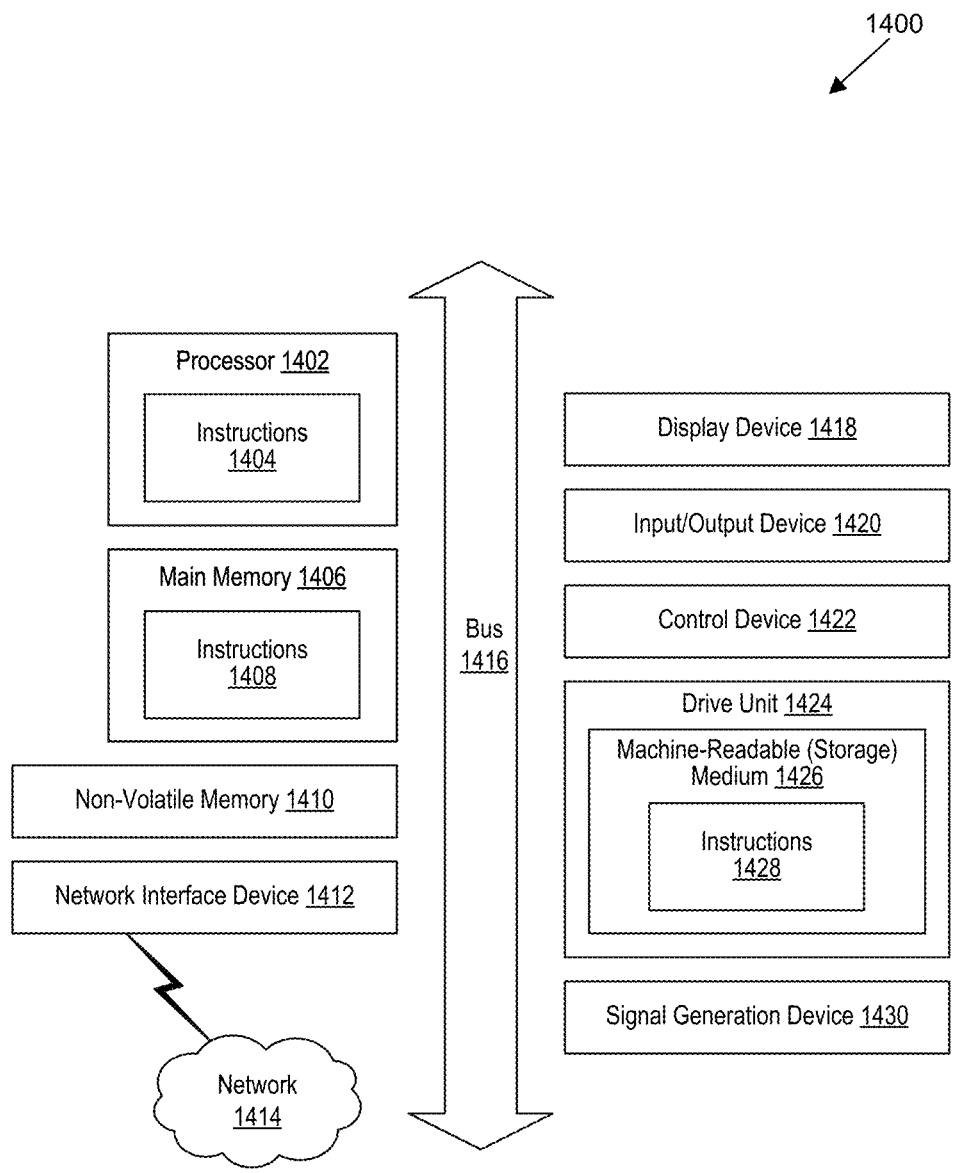
FIG. 14 is a block diagram that illustrates components of a computer system in which some operations described herein can be implemented.

FIG. 14 is a block diagram that illustrates an example of a computer system 1400 in which at least some operations described herein can be implemented. As shown, the computer system 1400 can include one or more processors 1402, main memory 1406, non-volatile memory 1410, a network interface device 1412, a video display device 1418, an input/output device 1420, a control device 1422 (e.g., keyboard and pointing device), a drive unit 1424 that includes a machine-readable (storage) medium 1426, and a signal generation device 1430, all of which are communicatively connected to a bus 1416. The bus 1416 represents one or more physical buses and/or point-to-point connections that are connected by appropriate bridges, adapters, or controllers. Various common components (e.g., cache memory) are omitted from FIG. 14 for brevity. Instead, the computer system 1400 is intended to illustrate a hardware device on which components illustrated or described relative to the examples of the Figures and any other components described in this specification can be implemented.

The computer system 1400 can take any suitable physical form. For example, the computer system 1400 can share an architecture similar to that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 1400. In some implementations, the computer system 1400 can be an embedded computer system, a system-on-chip (SOC), a single-board computer system (SBC), or a distributed system such as a mesh of computer systems, or it can include one or more cloud components in one or more networks. Where appropriate, one or more computer systems 1400 can perform operations in real time, near real time, or in batch mode.

The network interface device 1412 enables the computer system 1400 to mediate data in a network 1414 with an entity that is external to the computer system 1400 through any communication protocol supported by the computer system 1400 and the external entity. Examples of the network interface device 1412 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1406, non-volatile memory 1410, machine-readable (storage) medium 1426) can be local, remote, or distributed. Although shown as a single medium, the machine-readable (storage) medium 1426 can include multiple media (e.g., a centralized/distributed database and/or associated caches and servers) that store one or more sets of instructions 1428. The machine-readable (storage) medium 1426 can include any medium that is capable of storing, encoding, or carrying a set of instructions for execution by the computer system 1400. The machine-readable (storage) medium 1426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile memory devices and non-volatile memory devices 1410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in computing device(s). When read and executed by the processor 1402, the instruction(s) cause the computer system 1400 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include elements additional to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of the invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory computer-readable storage medium, carrying instructions to enable an operator to resolve an issue associated with a 5G wireless telecommunication network using augmented reality (AR) glasses associated with the operator, which, when executed by at least one data processor of a system, cause the system to:
   receive an indication of an issue associated with the 5G wireless telecommunication network and an indication of an operator capable of resolving the issue,
      wherein the issue is associated with a base station of the 5G wireless telecommunication network, and
      wherein the base station includes a sensor providing a first measurement associated with the base station;
   send a notification to the AR glasses associated with the operator,
      wherein the notification indicates the issue and prompts the operator to join a virtual collaboration room;
   receive a request to join the virtual collaboration room from the operator based on a gesture or a voice command detected by the AR glasses;
   create the virtual collaboration room including a screen shared among multiple operators and a visualization based on the first measurement provided by the sensor associated with the base station,
      wherein each operator among the multiple operators can interact with the screen,
      wherein the multiple operators are physically distant from each other,
      wherein the virtual collaboration room enables interaction using gestures and voice commands, and
      wherein the virtual collaboration room includes a breakout room enabling a subset of the multiple operators to collaborate;
   determine a tier associated with the issue,
      wherein a first-tier issue indicates a higher priority issue than a second-tier issue,
      wherein the first-tier issue indicates a critical issue; and
   prioritize network traffic associated with the virtual collaboration room representing the first-tier issue and carried by the 5G wireless telecommunication network over other network traffic.

2. The at least one non-transitory computer-readable storage medium of claim 1, comprising instructions to:
   receive a continuous feed of multiple steps associated with resolving the issue,
      wherein the multiple steps include an instruction communicated via voice, an instruction communicated via hand movement, an instruction communicated via typing, or an instruction communicated via selection;
   record the continuous feed of the multiple steps to obtain a recording;
   receive an indication from an operator among the multiple operators that the issue has been resolved and to log a resolution of the issue;
   upon receiving the indication from the operator, stop the recording of the continuous feed of the multiple steps;
   store the recording of the continuous feed of the multiple steps, an indication of the issue, and an indication of one or more operators involved in resolving the issue in a database;
   based on the issue and the one or more operators, determine a success rate of resolving the issue associated with each operator among the one or more operators;

receive an indication of a second issue associated with the 5G wireless telecommunication network,
    wherein the second issue is similar to the issue;
retrieve from the database the success rate of resolving the issue associated with each operator; and
based on the success rate of resolving the issue associated with each operator, send a second notification to second AR glasses associated with each operator.

3. The at least one non-transitory computer-readable storage medium of claim 1, comprising instructions to:
determine an operator location;
determine a tier associated with the issue,
    wherein a first tier indicates a high-priority issue, and a second tier indicates a low-priority issue;
based on the operator location, obtain an operator preference regarding a notification to send to the operator when the operator is at the operator location; and
based on the operator preference and the tier associated with the issue, send the notification to the AR glasses associated with the operator,
    wherein the notification includes an indication associated with the issue.

4. The at least one non-transitory computer-readable storage medium of claim 1, comprising instructions to:
receive from an operator among the multiple operators an instruction to move the sensor associated with the base station;
cause the sensor associated with the base station to move to a new position;
based on the new position, cause the sensor to gather a second measurement;
create a second visualization of the second measurement; and
provide the second visualization to the virtual collaboration room.

5. The at least one non-transitory computer-readable storage medium of claim 1, comprising instructions to:
determine a tier associated with the issue,
    wherein a first tier indicates a high-priority issue, and a second tier indicates a low-priority issue; and
based on the tier, prioritize network traffic carried by the 5G wireless telecommunication network and associated with the issue over other network traffic.

6. The at least one non-transitory computer-readable storage medium of claim 1, comprising instructions to:
receive a continuous feed of multiple steps associated with resolving the issue,
    wherein the multiple steps include an instruction communicated via voice, an instruction communicated via hand movement, an instruction communicated via typing, or an instruction communicated via selection;
record the continuous feed of the multiple steps to obtain a recording;
receive an indication from an operator among the multiple operators that the issue has been resolved and to log a resolution of the issue;
upon receiving the indication from the operator, stop the recording of the continuous feed of the multiple steps;
based on the multiple steps, create a summary of the multiple steps; and
store the recording of the continuous feed of the multiple steps, the issue, and the summary in a database.

7. The at least one non-transitory computer-readable storage medium of claim 1, comprising instructions to:
obtain multiple measurements associated with the 5G wireless telecommunication network, multiple issues associated with the 5G wireless telecommunication network and stored in a database, and multiple resolutions associated with the multiple issues;
based on the multiple measurements associated with the 5G wireless telecommunication network and the multiple issues, determine whether a second issue is occurring,
    wherein the second issue is associated with the 5G wireless telecommunication network;
upon determining that the second issue is occurring, suggest a resolution to the second issue based on the multiple issues and the multiple resolutions associated with the multiple issues;
request an approval from the operator to implement the resolution;
upon receiving the approval from the operator, implement the resolution; and
record the second issue and the resolution.

8. A system comprising:
at least one hardware processor; and
at least one non-transitory memory storing instructions, which, when executed by the at least one hardware processor, cause the system to:
receive an indication of an issue associated with a telecommunication network and an indication of an operator capable of resolving the issue;
send a notification to an augmented reality (AR) or virtual reality (VR) device associated with the operator,
    wherein the notification indicates the issue and prompts the operator to join a virtual collaboration room;
receive a request to join the virtual collaboration room from the operator based on a command detected by the AR or VR device;
create the virtual collaboration room, via the telecommunication network, including a screen shared among multiple operators,
    wherein each operator among the multiple operators can interact with the screen,
    wherein the multiple operators are physically distant from each other, and
    wherein the virtual collaboration room enables interaction; and
record operations performed in the virtual collaboration room until a resolution to the issue has been determined; and
determine a tier associated with the issue,
    wherein a first-tier issue indicates a higher priority issue than a second-tier issue,
    wherein the first-tier issue indicates a critical issue; and
prioritize network traffic associated with the virtual collaboration room representing the first-tier issue and carried by the telecommunication network over other network traffic.

9. The system of claim 8, comprising instructions to:
receive a continuous feed of multiple steps associated with resolving the issue,
    wherein the multiple steps include an instruction communicated via voice, an instruction communicated via hand movement, an instruction communicated via typing, or an instruction communicated via selection;

record the continuous feed of the multiple steps to obtain a recording;
receive an indication from an operator among the multiple operators that the issue has been resolved and to log a resolution of the issue;
upon receiving the indication from the operator, stop the recording of the continuous feed of the multiple steps;
store the recording of the continuous feed of the multiple steps, an indication of the issue, and an indication of one or more operators involved in resolving the issue in a database;
based on the issue and the one or more operators, determine a success rate of resolving the issue associated with each operator among the one or more operators;
receive an indication of a second issue associated with the telecommunication network,
 wherein the second issue is similar to the issue;
retrieve from the database the success rate of resolving the issue associated with each operator; and
based on the success rate of resolving the issue associated with each operator, send a second notification to a second ARNR device associated with each operator.

10. The system of claim 8, wherein the issue is associated with a base station of a wireless telecommunication network and wherein the base station includes a sensor providing a first measurement associated with the base station, the system comprising instructions to:
receive from an operator among the multiple operators an instruction to move the sensor associated with the base station;
cause the sensor associated with the base station to move to a new position;
based on the new position, cause the sensor to gather a second measurement;
create a second visualization of the second measurement; and
provide the second visualization to the virtual collaboration room.

11. The system of claim 8, comprising instructions to:
determine a tier associated with the issue,
 wherein a first tier indicates a high-priority issue, and a second tier indicates a low-priority issue; and
based on the tier, prioritize network traffic carried by the telecommunication network and associated with the issue over other network traffic.

12. The system of claim 8, comprising instructions to:
receive a continuous feed of multiple steps associated with resolving the issue,
 wherein the multiple steps include an instruction communicated via voice, an instruction communicated via hand movement, an instruction communicated via typing, or an instruction communicated via selection;
record the continuous feed of the multiple steps to obtain a recording;
receive an indication from an operator among the multiple operators that the issue has been resolved and to log a resolution of the issue;
upon receiving the indication from the operator, stop the recording of the continuous feed of the multiple steps;
based on the multiple steps, create a summary of the multiple steps; and
store the recording of the continuous feed of the multiple steps, an indication of the issue, and the summary in a database.

13. The system of claim 8, comprising instructions to:
determine an operator location;
determine a tier associated with the issue,
 wherein a first tier indicates a high-priority issue, and a second tier indicates a low-priority issue;
based on the operator location, obtain an operator preference regarding a notification to send to the operator when the operator is at the operator location; and
based on the operator preference and the tier associated with the issue, send the notification to the AR or VR device associated with the operator,
 wherein the notification includes an indication associated with the issue.

14. The system of claim 8, comprising instructions to:
obtain multiple measurements associated with the telecommunication network, multiple issues associated with the telecommunication network and stored in a database, and multiple resolutions associated with the multiple issues;
based on the multiple measurements associated with the telecommunication network and the multiple issues, determine whether a second issue is occurring, wherein the second issue is associated with the telecommunication network;
upon determining that the second issue is occurring, suggest a resolution to the second issue based on the multiple issues and the multiple resolutions associated with the multiple issues;
request an approval from the operator to implement the resolution;
upon receiving the approval from the operator, implement the resolution; and
record the second issue and the resolution.

15. A system comprising:
at least one hardware processor; and
at least one non-transitory memory storing instructions, which, when executed by the at least one hardware processor, cause the system to:
 receive an indication of a first issue associated with a wireless telecommunication network;
 receive a feed of multiple steps associated with resolving the first issue,
  wherein the multiple steps include an instruction communicated by an operator among multiple operators,
  wherein the operator among the multiple operators communicates the instruction via voice, via hand movement, via typing, or via selection;
 record the feed of the multiple steps to obtain a recording;
 receive an indication from an operator among multiple operators that the first issue has been resolved and to log a resolution of the first issue;
 store the recording of the feed of the multiple steps, an indication of the first issue, and an indication of one or more operators involved in resolving the first issue in a database;
 based on the first issue and the one or more operators, determine a success rate of resolving the first issue associated with each operator among the one or more operators;
 receive an indication of a second issue associated with the wireless telecommunication network,
  wherein the second issue is similar to the first issue;
 retrieve from the database the success rate of resolving the second issue associated with each operator;

based on the success rate of resolving the second issue associated with each operator, send a second notification to an AR/VR device associated with a second operator; and determine a tier associated with the issue,
wherein a first-tier issue indicates a higher priority issue than a second-tier issue,
wherein the first-tier issue indicates a critical issue; and prioritize network traffic associated with the AR/VR device representing the first-tier issue and carried by the wireless telecommunication network over other network traffic.

16. The system of claim 15, comprising instructions to:
receive an indication of an operator capable of resolving the second issue;
send the second notification to an AR/VR device associated with the operator,
wherein the second notification indicates the second issue and prompts the operator to join a virtual collaboration room;
receive a request to join the virtual collaboration room from the operator based on a gesture or a voice command detected by the AR/VR device associated with the operator;
create the virtual collaboration room, via a 5G wireless telecommunication network, including a screen shared among multiple operators,
wherein each operator among the multiple operators can interact with the screen,
wherein the multiple operators are physically distant from each other,
wherein the virtual collaboration room enables interaction using gestures and voice commands, and
wherein the virtual collaboration room includes a breakout room enabling a subset of the multiple operators to collaborate; and
record operations performed in the virtual collaboration room until a resolution to the second issue has been determined.

17. The system of claim 15, comprising instructions to:
receive a continuous feed of multiple steps associated with resolving the second issue,
wherein the multiple steps include an instruction communicated via voice, an instruction communicated via hand movement, an instruction communicated via typing, or an instruction communicated via selection;

record the continuous feed of the multiple steps to obtain a recording;
receive an indication from an operator among the multiple operators that the second issue has been resolved and to log a resolution of the second issue;
upon receiving the indication from the operator, stop the recording of the continuous feed of the multiple steps;
based on the multiple steps, create a summary of the multiple steps; and
store the recording of the continuous feed of the multiple steps, an indication of the second issue, and the summary in a database.

18. The system of claim 15, comprising instructions to:
determine an operator location;
determine a tier associated with the second issue,
wherein a first tier indicates a high-priority issue, and a second tier indicates a low-priority issue;
based on the operator location, obtain an operator preference regarding a notification to send to the operator when the operator is at the operator location; and
based on the operator preference and the tier associated with the second issue, send the notification to an AR/VR device associated with the operator,
wherein the notification includes an indication associated with the second issue.

19. The system of claim 15, comprising instructions to:
obtain multiple measurements associated with the wireless telecommunication network, multiple issues associated with the wireless telecommunication network and stored in a database, and multiple resolutions associated with the multiple issues;
based on the multiple measurements associated with the wireless telecommunication network and the multiple issues, determine whether the second issue is occurring;
upon determining that the second issue is occurring, suggest a resolution to the second issue based on the multiple issues and the multiple resolutions associated with the multiple issues;
request an approval from the operator to implement the resolution;
upon receiving the approval from the operator, implement the resolution; and
record the second issue and the resolution.

20. The system of claim 15, comprising instructions to:
determine a tier associated with the second issue,
wherein a first tier indicates a high-priority issue, and a second tier indicates a low-priority issue; and
based on the tier, prioritize network traffic carried by the wireless telecommunication network and associated with the second issue over other network traffic.

* * * * *